Feb. 25, 1947.   W. MORTON ET AL   2,416,454
WELDING MACHINE
Filed Nov. 22, 1943
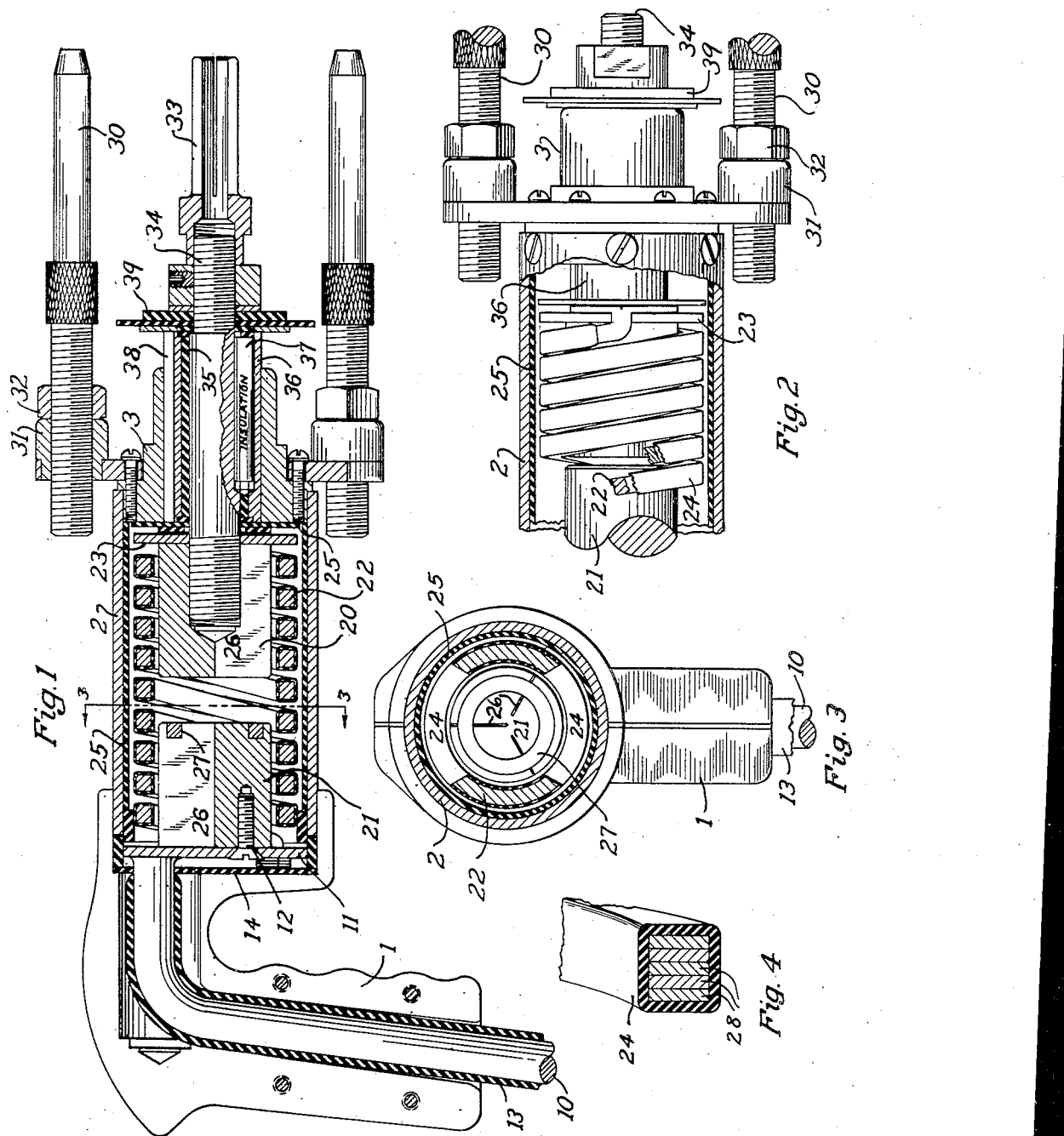
Inventor
Ray M. Murray, Jr.
By William Morton
Reynolds + Beach
Attorneys Patented Feb. 25, 1947

2,416,454

UNITED STATES PATENT OFFICE 2,416,454

WELDING MACHINE

William Morton and Ray M. Murray, Jr., Seattle, Wash.

Application November 22, 1943, Serial No. 511,236

9 Claims. (Cl. 219—4)

Our invention relates to welding equipment, and more particularly to a machine for welding studs or pads to a plate by electric arc welding.

While the machine may be useful for welding a number of different types of attachments to a foundation surface, its greatest utility is for welding studs and pads to a plate or other substantially flat surface, such as in ship construction. The studs have externally threaded shanks to project from the foundation member, and heads which are welded to such member. They vary in thread diameter usually from three-eighths to five-eighths of an inch and they may differ somewhat in length. The pads are usually somewhat shorter than the studs, are of cylindrical shape, and may or may not have enlarged heads. Their bores, threaded internally, may be of different sizes, again usually being from three-eighths to five-eighths of an inch in diameter.

The machines devised heretofore to perform this particular type of welding process have been rather complex, and not very reliable in operation. It is our principal object, therefore, to devise a machine containing the fewest possible number of parts and which is of substantial construction. Such a machine will perform the same general type of welding operation as previous machines.

More specifically it is an object to combine in the operation of a single element the functions of conducting welding current to the stud, serving as an electromagnet for withdrawing the stud from the foundation to which it is to be attached, for drawing an arc, and also driving the stud against the foundation element, after interruption of the welding current, to complete the welding operation.

An additional object is to make all parts of the machine sufficiently rugged so that a minimum of maintenance will be required, while at the same time the assembly is compact and easy to fabricate. Moreover the principal parts of the operating mechanism may be integrally connected to form a unit which may be removed and replaced quickly without requiring all individual members to be disassembled.

Other objects of our invention will be understood from a study of the specific description of the machine which follows. The drawing illustrates the construction which we prefer, but it will be recognized that changes may be made in it by persons skilled in the art without departing from the principal concept of our invention.

Figure 1 is a longitudinal section through the welding machine, while Figure 2 is a side elevation view of a portion of it, with parts broken away to show internal structure.

Figure 3 is a transverse section through the welding machine taken along the line 3—3 of Figure 1. Figure 4 is a transverse section through a fragment of the resilient magnetic coil.

The welding machine is capable of being operated by either direct current or alternating current, and since the power supply, and the control and timing of the welding current, are not features of the instant invention such mechanism has not been shown. The welding machine embodying our present invention is frequently referred to as a welding gun, because of the manner in which it is held and operated.

The machine is supported by the operator grasping handle 1, preferably of the pistol grip type, as shown in Figures 1 and 3. The forward end of this handle is secured in any suitable fashion to the body of the machine, including the barrel 2, which houses most of the operating mechanism. To the end of this barrel remote from the handle the head 3 is secured, which carries locating feet 30. Preferably three such feet are spaced approximately equally circumferentially of the gun to form a tripod for locating it relative to the plate or other foundation on which the stud is to be welded.

Since the welding operation is controlled by elements of the head unit it may be described first. Each of the three feet 30 is screwed into a threaded boss 31 projecting from a plate encircling the head 3. After they are adjusted individually to project equally and to the desired extent beyond their supporting plate each is fixed in position relative to its boss by a lock nut 32.

When the gun is held so that the projecting end of all the feet 30 engage the surface of the plate on which a stud or pad is to be welded the required action of the machine is first to press the stud or pad against the surface to make electrical contact, and then to withdraw the stud or pad slightly from such surface to strike an arc. After the head of the stud or pad and a local region of the plate have been heated sufficiently to soften the metal, approaching the molten state, the stud or pad is driven forcibly against the heated area of the plate and held in such position until the metal hardens, to complete the weld.

A collet 33 of appropriate type to hold a stud or pad is screwed onto the threaded end of a plunger 34. If a stud is to be welded preferably the collet 33 is of a size to embrace snugly the threaded shank of the stud, and its projecting end will abut the rear face of the stud head. To hold a pad, which is threaded internally, and the head of which may not project beyond the body, the collet should be shorter and may be formed internally to abut the end of the pad. For simplicity of description reference will be made hereafter only to a stud, but it will be understood that the machine will perform in the same manner for welding a pad to a plate as when welding a stud. Collets 33 to accommodate pads and studs of different sizes are readily interchangeable.

In order to be able to withdraw the stud slightly from the plate to which it is to be welded for striking an arc, and then to drive it forcibly forward again to complete the weld, the plunger 34 must be reciprocable in the head 3. Since this plunger also conducts the welding current to the stud, however, it should be insulated from the head. Consequently the plunger proper has an insulating sleeve 35 fitted closely about it, which in turn is received within a guide sleeve 36. The plunger 34, insulating sleeve 35, and guide sleeve 36 are all interconnected to prevent their relative rotation or endwise movement by a key 37, which may take the form of a cylindrical rod of insulating material. The guide sleeve 36, which slides in and is guided by a central bore of the head 3, is held against rotation relative to the head by a key 38 slidable in a groove in it.

The plunger 34 and collet 33 are reciprocated by electromagnetic action. The electromagnet mechanism is housed in barrel 2, and includes a divided steel core or armature, including a movable part 20 and a fixed part 21. This core is magnetized by a solenoid helix 22, which will be described more particularly hereafter.

The movable core element 20 is secured rigidly to plunger 34, preferably by the end of such plunger which projects within barrel 2 being screwed into this member, as shown. After the core part and plunger are thus interconnected the other elements may be assembled on the plunger. These includes the movable end plate 23, to which one end of helix 22 is secured, such as by silver solder or equivalent connection which will conduct electricity readily. This plate will conduct the welding current from the helix 22 to the plunger, through which it flows to collet 33 and the stud held in it.

In order to avoid any possibility of shorting between adjacent turns of the solenoid helix 22, or between the helix and the divided core or the barrel, the solenoid preferably is covered by an insulating sheath 24, which may be formed of fiber glass tape. In addition the barrel 2 itself may be protected by insulation 25 in the form of a sleeve extending from end to end of the barrel and an apertured disk at its head end through which the plunger 34 projects.

The sleeves 35 and 36 are next assembled on the plunger 34, and finally the head 3 is slid over the guide sleeve. These sleeves are clamped between the movable end plate 23 or its insulating disk and an insulating disk 39 on the outer end of the plunger 34 by a nut screwed onto such threaded plunger end behind the collet. Since collets 33 are not relied upon to hold together the parts of this assembly, they may be interchanged readily for accommodating studs and pads of various size without disturbing the rest of the operating mechanism. The plate carrying bosses 31 for holding feet 30 may then be assembled on the head 3, and it may be secured to the right end of the barrel by screws passing through the barrel and tapped into the head, as shown in Figure 2.

The handle 1 attached to the opposite end of the barrel 2 in a similar manner is preferably split along a central plane, and is hollow to accommodate a conductor 10 of large gauge, which carries the welding current. This conductor is secured to a fixed end plate 11 in the end of barrel 2 adjacent to the handle by silver solder or other suitable connection. The fixed core part 21 is also attached to this end plate, such as by screws 12. Although the handle may be of insulating material it is convenient to extend the conductor insulation 13 well up into the handle cavity. If the handle is made of metal the entire cavity must be insulated, and in addition an insulating disk 14 must be placed in the handle to insulate it from end plate 11.

The end of the electromagnet helix 22 adjacent to the handle is also permanently secured to the stationary end plate 11 by silver soldering or equivalent type of connection. It will be evident that such connection completes a path for current entirely through the welding gun from conductor 10 to collet 33 by way of plate 11, helix 22, plate 23, and plunger 34. All these parts, as has been described, are electrically insulated from the exterior parts of the machine, such as the handle 1, the barrel 2, and the head 3.

Helix 22 serves three purposes, as a current conductor, as an electromagnet, and as a resilient spring. It conducts the welding current from the conductor 10 to the collet 33 by the path described. Its second function is to act as the electromagnet solenoid for magnetizing parts 20 and 21. So that these core parts may operate with minimum loss caused by eddy currents they may be slotted radially at circumferentially spaced locations, as indicated at 26. In addition a copper shading ring 27, embedded in the end of the fixed core part 21, stabilizes the solenoid and prevents chatter during closest approach of the movable core part 20 to part 21, especially when alternating current is used. Because of the heavy current which is transmitted from the conductor 10 to the plunger 34 it is preferred that two nesting helix coils 22 be used to afford large conductor area while keeping the gun compact. The broken ends of both coils are shown in Figure 2.

As has been stated previously, the function of the electromagnet is to retract plunger 34 and collet 33 so that the head of the welding stud or pad will be withdrawn from the plate on which it is to be welded, after current has begun to flow, in order to strike an arc. The weld is completed by interrupting the current and immediately driving the stud forward forcibly to plunge its heated head into the heated area of the plate. Deenergization of the welding circuit through coils 22 will, of course, simultaneously demagnetize the core, so that the plunger 34 is no longer held rearwardly. In addition, however, a positive force must be provided to drive the stud against the plate in the manner described.

The third function of coils 22, therefore, is to serve as springs for thus driving plunger 34 by reaction between stationary end plate 11 and end plate 23 movable with the plunger. As previously stated, preferably two coils 22 arranged in intercoiled relationship are employed, the ends of which will be attached to each end plate at diametrically opposite locations. Consequently the spring action of the coils on such plates will be balanced so that the force applied to plate 23 by them will not tend to tilt it.

In order to function efficiently to conduct intense current coils 22 must be made of material having high conductivity. Copper would therefore be most suitable if only this attribute were of importance. Pure copper, however, has little resiliency, and a compromise with the conductivity may be necessary in order to obtain the proper spring action. On the other hand, the coils 22 are of heavy cross-section, preferably being rectangular to obtain the maximum cross-section for the minimum extent both radially and circumferentially of the coils, although they may be of circular section. If a metal having high resilience properties were employed for these coils the driving force which they would produce on interruption of the magnetizing current would drive the plunger 34 forward with too great force.

To obtain the desired resiliency, therefore, we prefer that coils 22 be of laminar construction, as shown in Figure 4, in which each spring is composed of several helical ribbons 28 piled axially. The radial extent of each ribbon is equal to the radial width of the coil cross-section. The sheath 24 may serve the additional purpose of binding these ribbons tightly together, or they may be otherwise held in contiguous face-to-face relationship.

If all the ribbons are made of the same material the laminated spring will have less stiffness than one of unitary construction composed of similar material. It follows, therefore, that the fewer the number of ribbons used in fabricating each coil the greater will be the spring stiffness. The resilience of each coil may be altered in another way, namely, by making one or more of the ribbons of material having a different degree of inherent resilience. Thus where a spring having five laminations, for example, as in Figure 4, is employed the central ribbon may be of a copper alloy having higher resiliency than copper, for example bronze, such as phosphor bronze, or brass. Such material, of greater resilience, would increase the driving force, while the conductivity would not be greatly decreased, since such a copper alloy would have reasonably good conductivity, and only a small fraction of such laminar spring would be made of it.

In designing the coils 22, therefore, precisely the desired spring action may be achieved, while maintaining adequate conductivity, by correlating properly the cross-section of the coils, their length, the number of laminations of which each coil is composed, and the type of material used for the several laminations, some of the laminations perhaps being of material different from others.

It will be understood that the machine shown in the drawings and described above requires a suitable power source and controls for initiating supply of current to the welding gun, and for interrupting it after the desired interval of time. Energization of coils 22 will magnetize the core so that its movable part 20 is attracted toward its stationary part 21 against the resilience of coils 22, which will be compressed simultaneously, until the plunger 34 has been retracted from the position of Figure 1 to that shown in Figure 2, in which the insulating disk 39 abuts the outer end of head 3. Rearward movement of the plunger is thus limited before the two core parts come into contact. Such engagement would, of course, short the helixes, since each core part is carried by an anchor plate for one end of the helixes. Despite the fact that such movement of the plunger withdraws the stud head from the plate which it contacted initially, current will continue to flow through the helix coils by way of the arc which has thus been struck between the plate and the stud head.

When the flow of current is discontinued by the timing mechanism, after the stud head and adjacent region of the plate have been heated sufficiently, the core or armature parts 20 and 21 are demagnetized. If the coils 22 have been properly designed their resilience will now drive plunger 34 forward with the desired force to sink the softened head of the stud into the softened material of the plate to the desired depth for completing the weld. After the weld has set for an instant the gun may be removed from the plate, which will pull the collet 33 off the stud.

It will be noted that the electrical conductor 10, the stationary end plate 11, coils 22, movable end plate 23, and core parts 20 and 21 have been described as all interconnected into an integral unit. These elements constitute the heart of the operating mechanism, and if the gun ceases to function properly it is usually because one or more elements of this unit have become defective.

By interconnecting these parts of the gun to form an integral unit servicing of the machine is greatly facilitated. It is only necessary to disconnect the parts of handle 1 from barrel 2, to remove head 3 from the other end of the barrel, and to unscrew plunger 34 from the movable core part 20 in order to withdraw the operating unit from the barrel. A new operating unit may then be inserted and the plunger, head and handle again attached in order to render the gun ready for operation once more. Such replacement of the operating unit can be done on the job without difficulty, and the defective unit either discarded or sent to a repair establishment without the gun being out of service.

We claim as our invention:

1. A welding gun comprising a supporting body, a chuck reciprocably supported therein, a solenoid coil supported from the body and having electrical connections at its respective ends to a source of welding current and to the chuck, a solenoid core part attractively disposed within the coil's magnetic field, reciprocably supported from the body, and operatively connected for conjoint reciprocation with the chuck, the solenoid coil being of resilient material to constitute a spring, and being mechanically interposed between the body and the chuck to drive the chuck outwardly from the body upon discontinuance of the welding current which by attraction of the core part draws the chuck inwardly towards the body.

2. The welding gun of claim 1, in which the coil is of laminar construction, including a plurality of resilient ribbons stacked axially of the coil to afford a given resilience to the coil as a whole, the radial extent of each ribbon cross-section being equal to that of the coil cross-section.

3. The welding gun of claim 1, in which the coil is of laminar construction, one lamination being made of material different from that of which another lamination is made.

4. The welding gun of claim 1, in which the coil is of laminar construction, including a plurality of ribbons stacked axially of the coil, the radial extent of each ribbon cross-section being equal to that of the coil cross-section, and one of said ribbons being made of a resilient copper alloy and another of said ribbons being made of substantially pure copper.

5. A welding gun for use with a weld current timer, comprising a barrel, a handle attached to one end of said barrel, a head attached to the other end of said barrel, work-engaging locating means carried by said head, a plunger received in a central aperture of said head and guided thereby for reciprocation axially of the head and adapted to hold a stud or the like against the work with which said locating means is engaged, stop means operable to limit the extent of reciprocation of said plunger away from the work, an electrical conductor extending through said handle into said barrel, an end plate fixed in said barrel and conductively secured to said electrical conductor, a fixed core part carried by said fixed plate, a movable plate in the end of said barrel adjacent to said head and conductively and mechanically secured to said plunger, a movable core part carried by said movable plate, two intercoiled resilient coils encircling said fixed and movable core parts, and having corresponding ends attached to said fixed end plate at substantially diametrically opposite locations and their other corresponding ends similarly attached to said movable end plate for conducting electric welding current from said electrical connection to said plunger, said coils also being operable as a solenoid by action of the welding current when flowing therethrough to magnetize said core parts for attraction of said movable core part toward said fixed core part to move the plunger inward relative to said barrel and away from the work, such movement of said plunger being operable to compress said coils as springs, to the extent permitted by said stop means, and said coils thus compressed being operable by their resilience and solely by and immediately upon cessation of current flow to drive said plunger forcibly outward relative to said barrel, to force the stud held by said plunger into contact with the work.

6. A welding gun for use with a welding current timing means, comprising a supporting body, a chuck reciprocably supported therein, a solenoid coil supported from the body and having electrical connections at its respective ends to a source of welding current and to the chuck, a solenoid core part attractively disposed within the coil's magnetic field, reciprocably supported from the body, and operatively connected to the chuck for conjoint reciprocation, the solenoid coil being of resilient material, and being mechanically interposed between the body and the chuck, and comprising the sole means to drive the chuck away from the body, and being compressed to that end by attraction of the core part upon energization of the coil, and becoming active so to drive the chuck solely by deenergization of the coil.

7. A welding gun comprising a supporting body, a chuck reciprocably supported therein, a solenoid coil within the body having electrical connections at its respective ends to a source of welding current and to the chuck, a solenoid core part attractively disposed within the coil-magnetic field, and fixed to the chuck for reciprocation therewith, the solenoid coil being of resilient material and being mechanically interposed as a spring between the body and the chuck to drive the chuck outwardly from the body upon discontinuance of the welding current which by attraction of the core part draws the chuck inwardly towards the body.

8. A welding gun comprising a supporting body, a chuck electrically connected to a source of welding current, and reciprocably supported from said body, a solenoid coil of resilient material mechanically interposed as a spring between the body and chuck, compressible upon inward movement of the chuck towards the body, and having electrical connections such that it is energized only during application of welding current through the chuck, a solenoid core part attractively disposed within the coil's magnetic field, reciprocably supported from the body, and operatively connected for conjoint reciprocation with the chuck, the several parts being so organized and arranged that the coil upon energization will draw the chuck towards the body by attraction of the core part, thereby compressing the coil, to effect outward expulsion of the chuck by the spring coil automatically upon deenergization of the coil.

9. The welding gun of claim 1, wherein the coil is duplicated by a second coil intercoiled with the first, and similarly electrically connected, the second coil being like the first in its resilient characteristics, and being mechanically connected between the body and to the chuck at points spaced diametrically from the corresponding connections of the first coil, to balance the bending moment about such connections of the first coil.

WILLIAM MORTON.
RAY M. MURRAY, Jr.

REFERENCES CITED

The following references are of record in the file of this patent:

UNITED STATES PATENTS

| Number | Name | Date |
|---|---|---|
| 2,191,494 | Nelson | Feb. 27, 1940 |
| 2,129,899 | Young | Sept. 13, 1938 |
| 1,359,620 | Ritchey | Nov. 23, 1920 |
| 1,995,001 | Ito | Mar. 19, 1935 |
| 2,265,169 | Hughes | Dec. 9, 1941 |

OTHER REFERENCES

Principles of Elec. Eng., Timbie & Bush, 1st ed., 1922, pages 348, 349, 354 and 355.